United States Patent [19]
Norris

[11] 4,042,864
[45] Aug. 16, 1977

[54] AC-DC TRACTION DRIVE CONTROL SYSTEM

[75] Inventor: Melvin N. Norris, Franklin, Pa.

[73] Assignee: Joy Manufacturing Company, Pittsburgh, Pa.

[21] Appl. No.: 585,210

[22] Filed: June 9, 1975

Related U.S. Application Data

[63] Continuation of Ser. No. 278,665, July 31, 1972, abandoned, which is a continuation of Ser. No. 16,309, Mar. 4, 1970, abandoned.

[51] Int. Cl.² .............................................. H02D 7/00
[52] U.S. Cl. .................................................... 318/301
[58] Field of Search .................... 109/61; 191/3, 4, 5, 191/12.2 A; 318/96, 249, 391, 395, 414, 284, 300, 301; 322/29; 180/2

[56] References Cited

U.S. PATENT DOCUMENTS

| | | | |
|---|---|---|---|
| 2,599,061 | 6/1952 | Lee | 191/12.2 A |
| 3,172,510 | 3/1965 | Lee | 191/12.2 A |
| 3,250,944 | 5/1966 | Musick | 318/395 |
| 3,299,338 | 1/1967 | Torii | 318/249 |
| 3,378,755 | 4/1968 | Sawyer | 322/29 |
| 3,515,970 | 6/1970 | Weiser | 318/249 |
| 3,584,281 | 6/1971 | Reeves | 318/284 |

FOREIGN PATENT DOCUMENTS

| | | | |
|---|---|---|---|
| 1,152,782 | 2/1958 | France | 191/5 |
| 1,803,555 | 5/1970 | Germany | 191/3 |

Primary Examiner—James R. Scott

[57] ABSTRACT

A control drive system for a vehicle, such as a shuttle car, operating back and forth between a work area and an unloading point wherein AC supplied from the unloading point is supplied to the vehicle via a cable and is converted to DC aboard the vehicle, and wherein control circuitry is provided for effecting the start-up, acceleration in forward and reverse directions and the operation of the vehicle at tram speeds in either direction.

18 Claims, 10 Drawing Figures

INVENTOR
MELVIN N. NORRIS

INVENTOR
MELVIN N. NORRIS

INVENTOR
MELVIN N. NORRIS

INVENTOR
MELVIN N. NORRIS

AC-DC TRACTION DRIVE CONTROL SYSTEM

RELATED APPLICATIONS

This is a continuation of application Ser. No. 278,665, filed July 31, 1972, now abandoned, which is a continuation of application Ser. No. 16,309, filed Mar. 4, 1970, now abandoned.

BACKGROUND AND BRIEF SUMMARY OF THE INVENTION

The present invention relates to a control drive system for a vehicle operating between two points and, more particularly, to a control drive system wherein AC is converted to DC aboard the vehicle for energizing the drive means of the vehicle.

In mining operations it is common to employ a shuttle car for transporting the material being mined, for example, coal, from the work area to an unloading area where the material is unloaded onto a conveyor belt or onto cars for transporting out of the mine. Such cars are electrically operated with the electrical energy being supplied thereto from a source at the unloading point via a cable which is reeled out from a reel as the car leaves the unloading point toward the work area, and conversely is reeled onto the reel as the car leaves the work area and returns to the unloading point. Two types of systems are presently in common usage, namely, the AC type and the DC type. In the AC type, alternating current supplied at the unloading point is applied via a trailing cable to the shuttle car and is utilized for driving AC motors which supply the driving power for the wheels of the shuttle car. The AC type of system has a number of disadvantages inherent in the use of AC drive motors. Each time the shuttle car is stopped for loading, unloading, or other reasons, the motors are de-energized and must be started from the de-energized condition. In-rush current for AC motors is very high, for example, in a 480 volt, three phase AC machine, the in-rush current may be as high as 290 amperes. This causes a large voltage drop in the trailing cable, resulting in high energy losses in the cable and thus greatly decreasing the efficiency of the system. To compensate for these losses, it becomes necessary to employ relatively large cables so that the motors may be operated at their rated voltages. Another disadvantage of the AC system is the problem of running over synchronous speeds wherein the AC motor acts as a generator and may introduce excessive current in other drive motors of the system. For example, when one AC motor is used to drive wheels on one side of the shuttle car, and another motor is utilized to drive the wheels on the other side of the car, as the car goes around a corner the motor driving the outside wheels will be required to go above synchronous speed, which may cause excessive current to be applied to the motor driving the inside wheels.

The DC type of system utilizes DC supplied from a DC source via a trailing cable to the car. DC may be supplied from outside of the mine, or may be converted from alternating current supplied at the unloading point by rectification. It is then supplied via a DC cable to the shuttle car wherein it is utilized for supplying DC traction motors for driving the wheels of the car. The use of DC traction motors has the advantage of providing excellent performance, especially under high load conditions. However, as in the AC case, serious cable losses result at the start-up due to in-rush current. For example, a 250 volt DC machine may have an in-rush current of 250 amperes. Thus a relatively large DC cable must be used in order to compensate for the voltage drop during the start-up and tramming operation. Another disadvantage of the DC system is that only DC is available aboard the car, where it would be highly desirable to utilize AC for auxiliary equipment, such as, a pump motor for the hydraulic system aboard the vehicle, or a conveyor motor for the operation of the unloading conveyor aboard the vehicle. For these purposes it is desirable to utilize AC motors operative at a constant speed and which are highly reliable. Another disadvantage of the DC system is the potential damage which may result to the diodes of the rectifier employed to convert the AC to DC at the unloading point due to faults. The most common place for faults to occur is in the trailing cable, and at the occurrence of such a fault, high currents may be applied to the diodes of the rectifier which is located adjacent to the AC source at the unloading point.

The AC-DC system of the present invention takes advantage of all the inherently desirable features of the DC system while introducing none of the disadvantages of either the DC or AC system. In the system of the present invention, AC supplied from the unloading point is converted to DC by rectification performed aboard the shuttle car itself. The DC is then controllably applied to drive DC traction motors aboard the car. However, in that AC is available aboard the shuttle car, auxiliary motors, such as, pump and conveyor drive motors, may be AC motors which provide constant speed and high reliability of operation. Due to the AC-DC conversion aboard the car, in-rush current losses are greatly minimized as compared to the AC type or DC type of system. For example, an in-rush current of 60 amperes may be expected as compared to a 250 to 290 amperes in-rush current for the AC and DC type systems, respectively, for motors of the same ratings. Hence, much smaller trailing cables may be utilized for the AC-DC system of the present invention. Additionally, due to lower cable losses a higher over-all efficiency is obtained in the present system. In that the diodes used for rectification of the AC to DC aboard the shuttle car are separated from the A.C. Source at the unloading point by the cable, any fault currents induced by a fault in the cable will be attenuated by the impedance of the cable, thereby diminishing the possibility of damaging diodes.

Broadly, the present invention provides a control drive system for supplying a vehicle operating between a base point and a work point, wherein AC at the base point is supplied to the vehicle via a cable and is converted to DC aboard the vehicle for driving the vehicle.

DESCRIPTION OF THE PREFERRED EMBODIMENTS

Figure 1A:
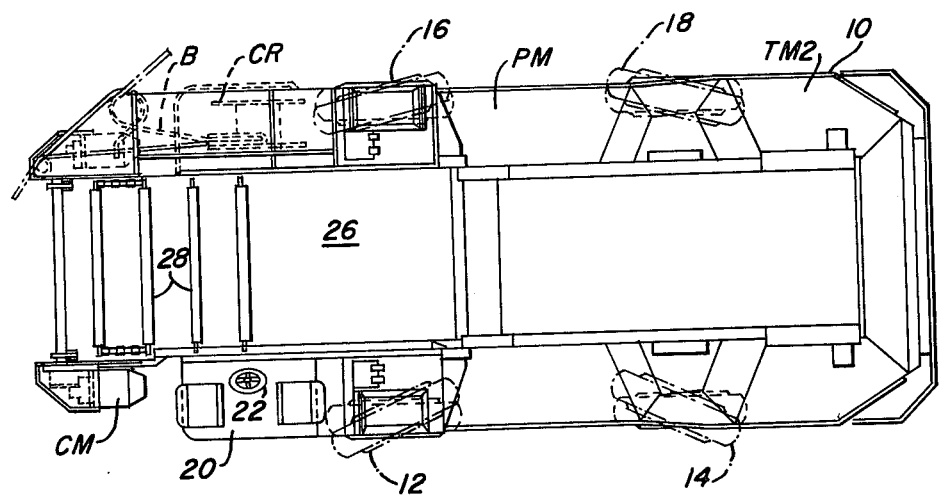
FIG. 1A is a top view of a shuttle car which may employ the control drive system of the present invention.
Figure 1B:
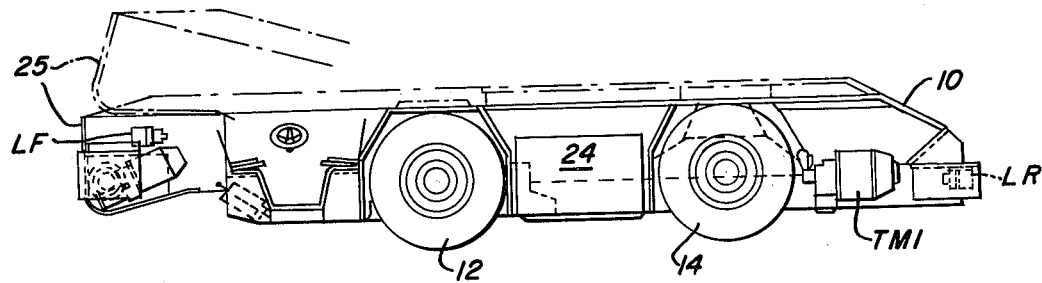
FIG. 1B is a side view of the shuttle car of FIG. 1A.

Referring now to FIGS. 1A and 1B, a shuttle car adapted for mining operations is shown wherein the control drive system of the present invention may be employed. The shuttle car, as shown, comprises a four-wheeled vehicle including a body 10 and four wheels 12, 14, 16 and 18, whereon pneumatic tires are mounted. An operator's station 20 is provided wherein the operator sits and controls the operation of the vehicle. A steering wheel 22 is provided for steering the vehicle with the front wheels 12 and 16 and the back wheels 14 and 18 also being independently steerable.

The wheel pairs on each side of the vehicle are separately driven by DC traction motors. Thus the left wheel pair 12–14 is driven by a traction motor TM1, better shown in FIG. 1B, and the right wheel pair 16–18 is driven by a traction motor TM2, not shown. Thus a positive traction drive is provided for the shuttle car through the use of the independent drive for the left and right wheel pairs. Electrical power is supplied to the shuttle car via a trailing cable B which comprises a three phase AC cable connected at one end to a three phase AC source at the unloading station for the shuttle car, and at the other end via a cable reel CR to a controller 24 aboard the shuttle car. A pump motor PM is provided aboard the shuttle car for providing operating power for a hydraulic system for driving the cable reel CR and also providing operating power for the power steering mechanisms of the front wheel pair 12–16 and the back wheel pair 14–18. The pump motor PM may comprise a three phase AC motor driven directly by the AC supplied aboard the shuttle car by the cable B. The AC pump motor PM drives the cable reel CR so that cable B is payed out of the cable reel CR as the shuttle car moves away from the unloading station toward a work area and conversely reels in the cable as the shuttle car leaves a work area and approaches the unloading station.

The shuttle car includes conveyor assembly 25 including a loading area 26 wherein material such as coal is loaded aboard the car at the work area and conveyor means 28 for unloading the material from the loading area 26 of the shuttle car. The conveyor chain is driven by a conveyor motor CM which may comprise a three phase AC motor either of a single speed or multiple speed design. Thus, when it is desired to unload the material in the area 26 at the unloading station, the conveyor motor CM is activated to drive the conveyor 28 which unloads the car at the unloading station, typically onto coal cars or onto a conveyor belt for removal from the mine. The conveyor assembly 25 including the loading area 26 and the conveyor 28 therewith may be hydraulically raised or lowered by power supplied via the hydraulic system of the shuttle car, which is driven by the pump motor PM. As shown in FIG. 1B, the conveyor is in its low position in solid lines and in its elevated position in dotted lines. Hence by either raising or lowering the conveyor assembly 25, material may be unloaded accordingly onto cars or a conveyor belt having different loading heights.

The controller 24 controls the application of AC to the pump motor PM and the conveyor motor CM. The controller 24 also includes an AC to DC converter for providing a DC output for driving the traction motors TM1 and TM2. The shuttle car is additionally provided with front lights LF and rear lights LR for illumination and safety purposes.

The operator of the shuttle car selects the direction of operation of the vehicle and the tram speed desired. The design of the controller 24 is such that the proper control and timing functions are performed for the desired acceleration and operation of the shuttle car. The control drive system is better explained with reference now to FIG. 2.

Figure 2A:
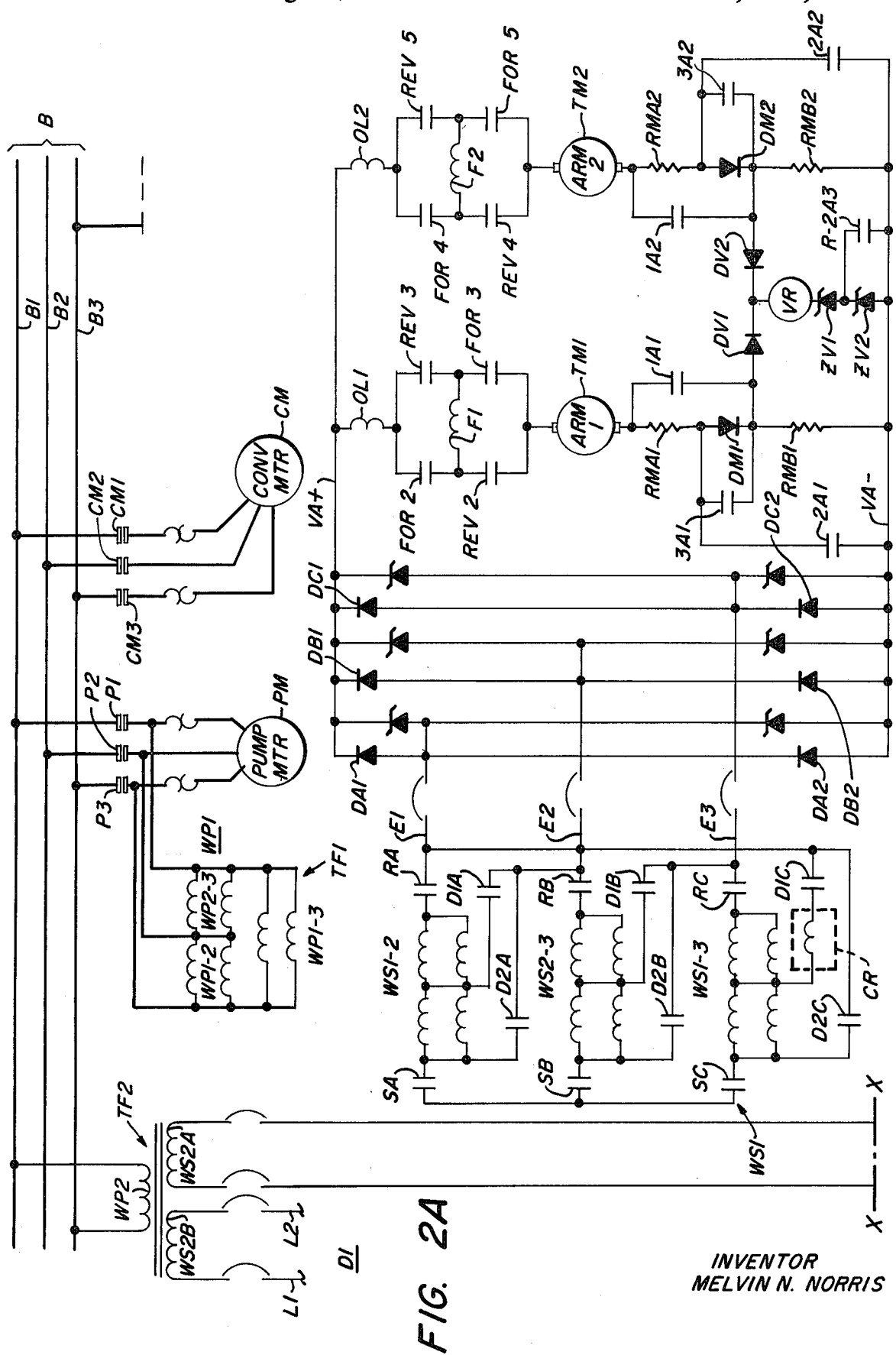
FIGS. 2A, 2B and 2C represent a schematic diagram of the control drive system of the present invention.
Figure 2B:
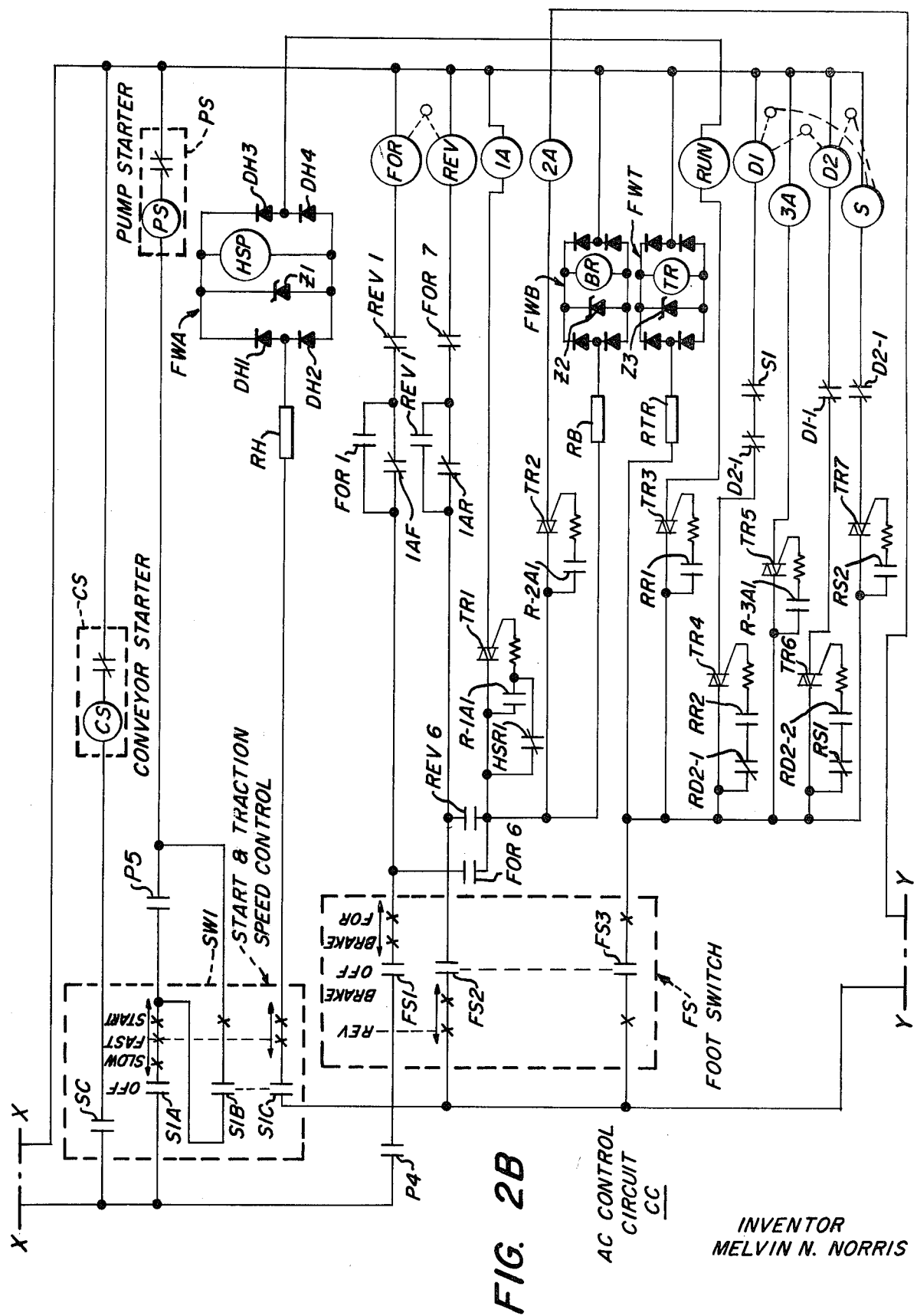
Figure 2C:
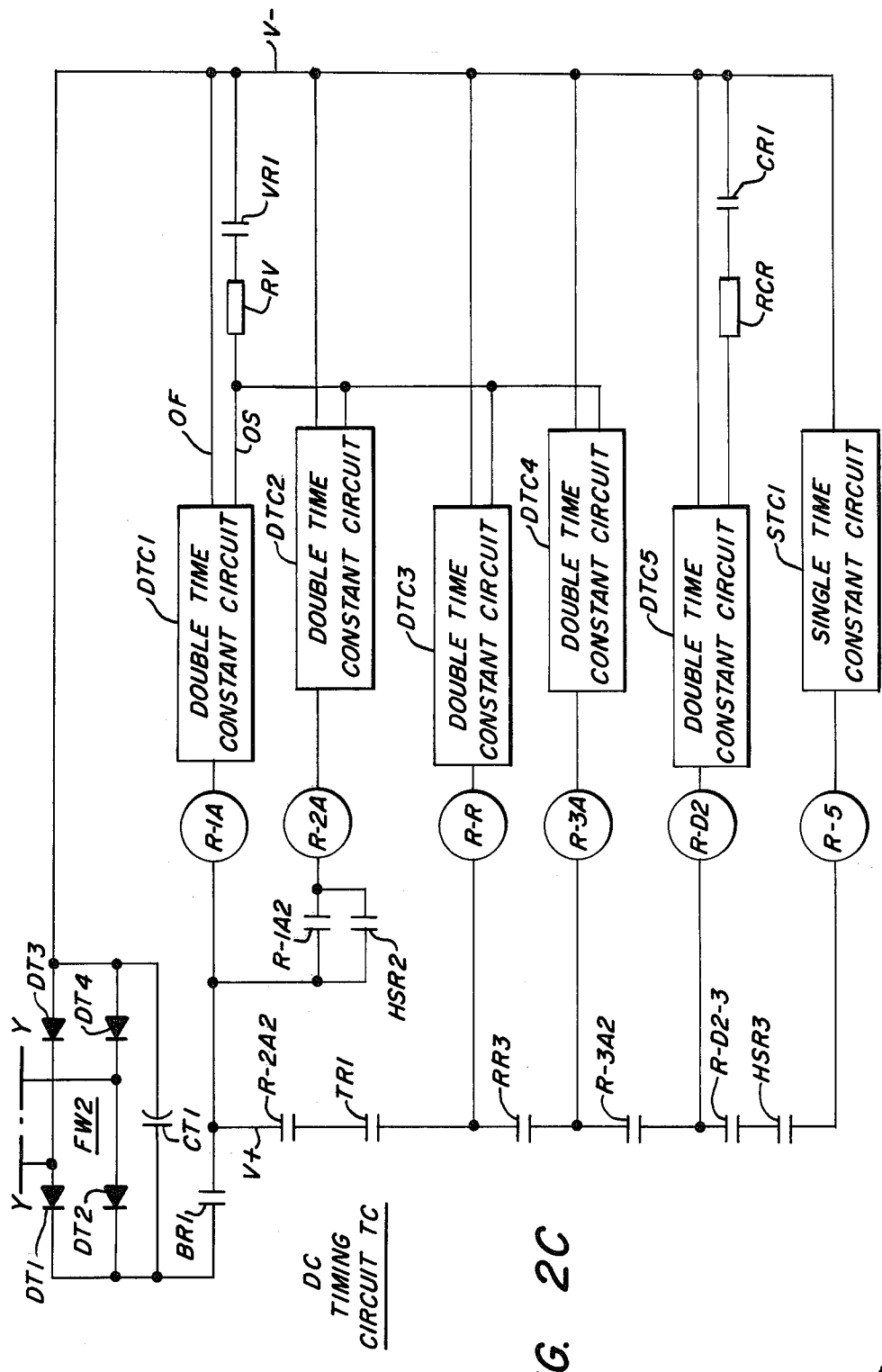

FIG. 2 shows the apparatus and circuitry which is carried by the shuttle car. Operating power for the apparatus and circuitry is provided from the AC cable B, which is connected between three phase AC source (for example, supplying 480 volts) located at the unloading station and the shuttle car. The cable B includes three conductors B1, B2 and B3, which define the respective phases of the three phase source.

The principal driving apparatus aboard the shuttle car are the AC pump motor PM, the AC conveyor motor CM and the pair of DC traction motors TM1 and TM2. The pump motor PM and the conveyor motor CM are supplied directly from the AC conductors B1, B2 and B3 via suitable contactors P1-P2-P3 and CM1-CM2-CM3, respectively. The function of the pump motor PM is to supply suitable mechanical energy to the hydraulic system of the shuttle car for use, for example, in providing power steering for the vehicle and for hydraulically lifting and dropping the conveyor assembly 25 of FIG. 1. Also the pump motor PM is utilized for operating the cable reel. The conveyor motor CM is utilized for driving the conveyor 28 aboard the shuttle car and may comprise, for example, a two speed AC motor for driving the conveyor belt at either a fast or a slow speed as selected.

Operating power for the traction motors TM1 and TM2 is provided by transforming the AC input on the cable B via a transformer TF1 and converting the AC output from the secondary of the transformer TF1 to DC via a full wave rectifier bridge FW1. The motors TM1 and TM2 include, respectively, series field windings F1 and F2. The direction of operation of the traction motors TM1 and TM2 is controlled by the direction of current flow through the respective field windings F1 and F2.

The controller circuitry carried aboard the shuttle car includes a control circuit CC and a timing circuit TC. The operation of the shuttle car is controlled by the operator through the use of a start and tram speed switch operator control SW1 and a foot switch FS for selecting the forward or the reverse direction of vehicle operation.

The operation of the shuttle car is commenced by the operator moving the operator control SW1 from the "off" position to the "start" position. This causes the contactors S1A and S1B to be closed, thereby completing a circuit through a pump starter PS which includes a solenoid coil and a normally closed overload contactor. The pump starter coil PS is thus connected across a secondary winding WS2A of a transformer TF2 which has its primary WP2 connected across the B1–B3 phase of the input AC. The voltage developed across the secondary winding WS2A of the transformer TF2 may, for example, be 120 volts, which is suitable for supplying the control circuit CC. The energization of the pump starter PS causes the contactors P1, P2 and P3, between the conductors B1, B2 and B3, respectively, and the motor PM to be closed thereby energizing the pump motor PM which then supplies power to the hydraulic system of the car. The closing of the contactors P1, P2 and P3 also causes the primary winding WP1 of the transformer TF1 to be energized. Additionally, the energization of the pump starter PS causes a pump contactor P4 in series with the foot switch FS to be closed and a contactor P5 in series with the contactor S1A to pick-up and lock in the starter PS.

Assume that the operator, after going to the start position, places the control SW1 in the "fast" position, thereby selecting a fast speed of operation for the shuttle car. The shuttle car is then ready for operation in either the forward or reverse direction by the operator operating the foot switch FS. Assume that the forward direction of operation is selected, thus the foot switch FS is depressed in the forward direction closing the contactors FS1 and FS3 while the reverse contactor FS2 remains in the open position. The closing of the forward contactor FS1 causes a forward starter coil FOR to be energized via the pump contactor P4, previously closed, a normally closed contactor 1AF, and a normally closed reverse contactor REV1. The energization of the forward starter coil FOR causes the contactor FOR1 connected across the normally closed contactor 1AF to close, thus maintaining the energization of the forward relay FOR independently of the state of the 1A relay.

The energization of the forward starter coil FOR also causes contactors FOR2 and FOR3 connected to the field winding F1 of the motor TM1 to close and also the contactors FOR4 and FOR5 connected to the field winding F2 of the traction motor TM2 to close. It should be noted, however, that no current is supplied to either field winding F1 or F2 since the secondary winding WS1 of the transformer TF1 is still an unenergized state.

When the fast speed of operation was selected, the contactor S1C in the operator control SW1 closes causing a high speed DC relay HSR to be energized via a resistor RH and a diode bridge FWA including diodes DH1, DH2, DH3 and DH4 with the relay HSR being connected across the bridge. A Zener diode Z1 is also conected across the bridge to regulate the DC voltage thereacross. The energization of the high speed relay HSR causes normally closed contactor HSR1 to open which prevents the energization of the relay 1A. The closing of the contactor FOR6 causes a brake relay BR to be picked up. The brake relay BR is similar to the high speed relay HSR and is connected in a similar diode bridge array FWB and is regulated via a Zener diode Z2. The energization of the brake relay BR via the resistor RB and the diode bridge causes contactor BR1 to close thereby inserting a portion of the timing circuit into the control system. The placement of the foot switch FS in the forward position causes the contactor FS3 thereof to close providing energizationfor a high speed DC tram relay TR connected in a diode bridge FWT regulated by a Zener diode Z3. Contactor TR1 is picked up thereby presetting the remaining portion of the timing circuit for insertion when the relay R2A is energized.

A timing circuit TC is operated from DC which is supplied thereto via a full wave bridge FW2, which includes diodes DT1, DT2, DT3 and DT4. The input of the full wave bridge FW2 is supplied from the secondary winding WS2A of the transformer TF2, with the full wave output thereof being filtered via a capacitor CT1. The DC output is provided at line V+ and V−, with the V+ line connected to the timing circuit TC via the contactor BR1.

The closing of the contactor BR1 thus applies a DC voltage to the series connection of a relay R-1A and a double time constant circuit DTC1. When the double time constant circuit DTC1 times out the relay R-1A will be energized.

The double time constant circuit DTC1 times out at either a fast time constant (for example, one-tenth of a second) or at a slow time constant (for example, one second) depending upon the degree of energization of the traction motors TR1 and TR2. The circuit DTC1 provides either of two circuits from the relay R-1A: (1) directly to the negative line V− through the connection OF which defines the fast connection, or (2) through the connection OS, a resistor RV and a contactor VR1 which is normally open to the V-line. The relay coil VR associated with the contactor VR1 is connected to the starting resistors RMB1 and RMB2 of the traction motors TM1 and TM2, respectively, to sense the voltage developed therein. Since at the time under discussion the secondary winding WS1 of the transformer TF1 has not been connected, no voltage will appear across the relay coil VR, therefore the contactor VR1 will remain in its open condition.

Figure 6:
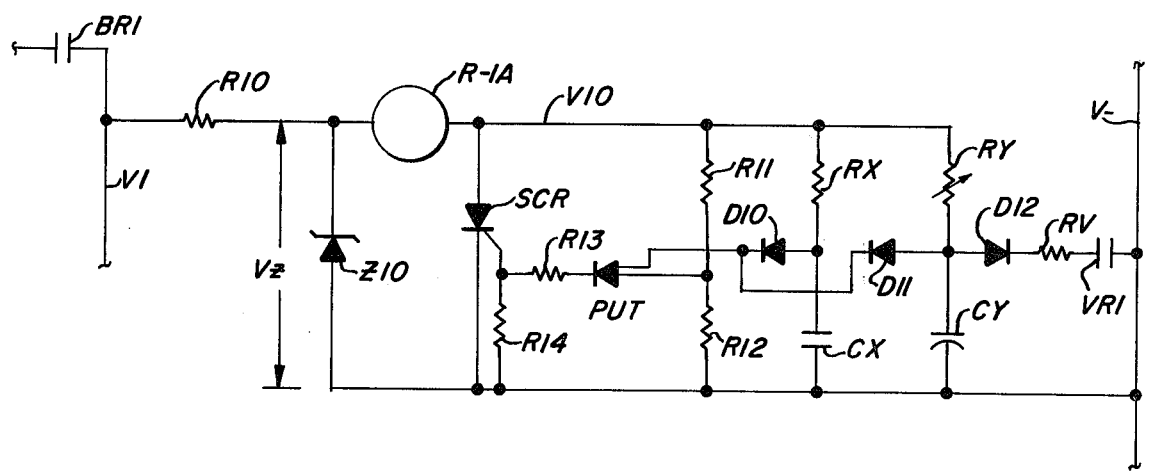
FIG. 6 is a schematic diagram of a double time constant circuit utilized in the system of FIG. 2.

Thus, the double time constant circuit DTC1 will time out at its fast time constant, for example, of one-tenth of a second, whereafter the relay R-1A will be energized. A schematic diagram of the double time constant circuit DTC1 is shown in FIG. 6, which will be described in detail below. Also the double time constant circuits designated DTC2, DTC3, DTC4 and DTC5 also comprise a circuit such as shown in the schematic of FIG. 6, and time out according to one of two time constants as determined by the open or closed state of the contactor VR1.

When the relay R-1A times out, contactor R1A1 closes which is connected across the now opened contactor HSR1. This completes a circuit to the gate turn-on electrode of a triac TR1. Hence, a conductive path is completed to the relay 1A which is energized. The energization of the relay 1A causes contactor 1A1, associated with the motor TM1, and contactor 1A2, associated with the motor TM2 to close. The traction motor TM1 has connected in series with the armature ARM1 thereof, a starting resistor RMA1, a diode DM1 and the starting resistor RMB1. The contactor 1A1 is connected across the resistor RMA1 and the diode DM1 and thereby shorts out this portion of the total starting resistance when the relay 1A picks up. The armature ARM2 of the traction motor TM2 has total starting resistance including a resistor RMA2, a diode DM2 and the resistor RMB2. The contactor 1A2 is connected across the resistor RMA2 and the diode DM2 and causes these components to be shorted out upon the closure of this contactor. The sensing relay VR is connected in series with a pair of Zener diodes ZV1 and ZV2 across the resistors RMB1 and RMB2 via diodes DV1 and DV2, respectively, and thus the relay VR can sense the degree of energization of both motors TM1 and TM2.

The energization of the relay R-1A also causes contactor R-1A2 in series with a relay R-2A to close. Contactor HSR2 in parellel with contactor R-1A2 had previously been opened by the energization of the relay HSR. In response to the closing of the contactor R-1A2, the relay R-2A is energized at a time according to the time constant of the double time constant circuit DTC2.

In that no voltage still has been developed at the traction motors TM1 or TM2, the double time constant circuit DTC2 will time out at its fast time constant, for example, of one-tenth of a second.

The energization of the relay R-2A causes contactor R-2AL in series with the gate turn-on electrode of a triac TR2, to close, which turns on the triac TR2 to complete an energizing path for a relay 2A in series therewith. The energization of the relay 2A causes contactor 2A1 connected across the diode DM1 and the resistor RMB1 to close thereby placing the resistors RMA1 and RMB1 in parallel, also contactor 2A2 closes in response to the activation of relay 2A connected across the diode DM2 and the resistor RMB2, which upon closing places the resistors RMA2 and RMB2 in parallel.

The energization of the relay R-2A also causes the contactor R-2A2 to close, and, since contactor TR1 associated with the traction relay TR had previously been closed upon the placement of the foot switch FS in the forward position, this completes an energization path to a relay R-R when a double time constant circuit DTC3 times out which will time out at the fast rate in that no voltages still appear at the traction motors TM1 and TM2. Note however that at the time that the relay R-2A is energized that a contactor R-2A3 connected across the Zener diode ZV2 (connected in series with the relay coil VR) closes thereby reducing by approximately one-half the voltage required to energize the relay VR.

The energization of the relay R-R causes contactor RR1 to be closed thereby providing a gating signal to the triac TR3 which is turned on to complete an energization path for a run starter RUN. Also, contactor RR2 is closed completing a path to the turn-on electrode of a triac TR4, via the normally closed contactor RD2-1. The starter D1 is energized via the triac TR4 and normally closed contactors D2-1 and S1. The energization of the run relay RUN causes the closure of contactors RA, RB and RC, associated with the secondary winding WS1 of the transformer TF1, and the energization of the D1 relay causes the closure of the contactors D1A, D1B and D1C also associated with the secondary winding WS1.

The closure of the contactors RA, RB, RC, D1A, D1B and D1C provides a complete circuit for the energization of the secondary winding WS1. The transformer TF1 includes a primary winding WP1 which has six individual windings with respective pairs of windings being connected in parallel and across the respective phases of the three phase input lines B1, B2 and B3. The primary winding WP1 thus consists of the winding pairs WP1-2, WP2-3 and WP1-3. The secondary winding WS1 includes three pairs of windings associated with the primary winding pairs, with the secondary winding of each pair being center tapped and commonly connected. Accordingly, the secondary winding WS1 includes the pairs WS1-2, WS2-3 and WS1-3, corresponding to the respectively designated primary windings. By the closure of the run contactors RA, RB, RC one of the secondary windings WS1-2, WS2-3 and WS1-3, respectively, are connected via the lines E1, E2 and E3 to the input of the full wave rectifier bridge FW1. The closure of the contactors D1A, D1B and D1C connects the secondary winding WS1 in an extended delta connection such as better shown in FIG. 3.

The closure of the contactors D1A, D1B and D1C establishes the start-up energization for the traction motors TM1 and TM2, with a low voltage being developed between the respective inputs E1-E2, E2-E3 and E1-E3 of the bridge rectifier FW1. For example, with a 480 volt input at the primary winding WP1, 60 volts may be developed between each of the phases at the input of the bridge rectifier FW1, as would be desirable for the initial start-up energization of the traction motors.

The full wave bridge rectifier FW1 includes six diodes, DA1, DA2, DB1, DB2, DC1 and DC2. Each of these diodes is shunted by a transient voltage suppressor. Between the cathode connection of the diodes DA1, DB1 and DC1, and the anode connection of the diodes DA2, DB2 and DC2, a DC voltage is established between the lines VA+ and VA−. The magnitude of the voltage established between the lines VA+ and VA− is dependent upon the configuration of secondary winding WS1 and hence determines the degree of energization of the motors TM1 and TM2.

With the relatively low DC voltage established by the closing of the contactors D1A, D1B and D1C, the traction motors TM1 and TM2 will now begin to receive start-up energization in the forward direction. Current will be provided from the VA+ line through an overload relay coil OL1, the forward contactor FOR2, the dotted end of the field winding F1, the forward contactor FOR3, the armature ARM1, the parallel connection of the resistors RMA1 and RMB1 to the VA− line. The energization of the traction motor TM2 will occur via a path including an overload relay coil OL2, forward contactor FOR4, into the dotted end of the field winding F2, forward contactor FOR5, the armature ARM2, the parallel connection of the resistors RMA2 and RMB2.

The timing procedure continues with the energization of the R-R relay causing contactors RR3 to be closed which provides an energization path for the relay R-3A in series with the double time constant circuit DTC4. The circuit DTC4 will time out in accordance with the degree of energization of the traction motors TM1 and TM2. As noted above, with the closing of contactor R-2A3 connected across the Zener diode ZV2, it is only necessary that the threshold voltage of the other Zener diode 2V1 be exceeded for the sensing relay VR to be energized. If the relay VR is energized, this will cause the long time constant of the double time constant circuit DTC4 to be employed.

Upon the energization of the relay R-3A, the contactor R-3A1 in the gate turn-on circuit of a triac TR5 closes, thereby rendering conductive the triac TR5 which permits the energization of the relay 3A in the control circuit. The activation of the relay 3A causes contactor 3A1 connected across the diode DM1 and the contactor 3A2 connected arceoss the diode DM2 to close. This then completely shorts out all of the starting resistance in both armature circuits of the motors TM1 and TM2, permitting the full degree of energization thereof.

Figure 3:
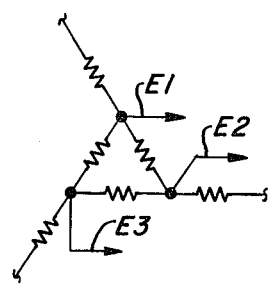
FIGS. 3, 4 and 5 are schematic diagrams of the transformer secondary configuration as sequentially utilized in the operation of the system of FIG. 2.

The traction motors TM1 and TM2 would thus receive a degree of energization as determined by the D1 figuration of the secondary winding WS1, as shown in FIG. 3. This will cause the start-up of the shuttle car at a slow rate of speed with the shuttle car accelerating as the energization increases to the motor until the next degree of energization defined as the D2 energization condition, or the slow tram speed condition is established. The slow tram speed is established uner the control of the timing control circuit as follows. The activation of the relay R-3A also causes contactor R-3A2 to pick up, thereby providing an energization path to a relay R-D2, which is connected to a double time constant circuit DTC5. The time constant that is selected for the double time constant circuit DTC5 is not determined by the voltage sensing relay VR in the armature circuits of the traction motors TM1 and TM2 since the relay coil VR was shorted out by the closing out of the contactors 2A1-3A1 and 2A2-3A2. To select the time constant for the circuit DTC5 a current relay coil CR is connected between the center cap of the secondary winding WS1-3 and the contactor D1C. If the current flowing through the relay coil CR is below a predetermined value, contactor CR1 connected via a resistor RCR to the double time constant circuit DTC5 will remain open, which will cause a fast time constant circuit, for example, one-fifth of a second, to be utilized. If, on the other hand, the current through the coil CR exceeds a predetermined value, the contactor CR1 will close, thereby inserting a long time constant, for example, one second, to be used in the circuit DTC5 before it times out.

The use of the double time constant circuit DTC5 under the control of the current relay CR thus makes the next degree of energization for the traction motors TM1 and TM2 be dependent upon both the current output of the secondary winding of the transformer TF1, and also upon the predetermined time constant of the circuit DTC5. If the switch to the next energization state for the traction motors TM1 and TM2 for the acceleration thereof was determined solely by time independent of current, under light load (low current) conditions for the vehicle, for example, this might require an excessive time for acceleration. Alternatively, at heavy load (high current) conditions the switch to the next energization state might occur too quickly. On the other hand, if the switch to the next energization state for the traction motors should be made dependent upon current alone, under high load conditions for the traction motors wherein high currents are drawn, the traction motors might not accelerate if the switch to the next energization state depended upon the current dropping below a predetermined value before the switch could be effected. In the present control system, however, the sequencing to the next energization state is accomplished on the basis of both current and time. Thus, independent of the magnitude of the current after the lng time constant, for example, of one second, has timed, out, the traction motors will be switched to their next degree of energization for the acceleration thereof even under high load conditions where large currents are drawn.

After the double time constant circuit DTC5 has timedout, the relay R-D2 is energized, thereby causing contactor RD2-1 to close. The contactor RD2-2 is in series with a normally closed contactor RS1, associated with a relay RS which has not yet been energized. Closing of the contactor RD2-2 in the gate turn-on circuit of a triac TR6 causes the triac TR6 to translate current therethrough now closed contactor D1-1, to energize the relay D2. The contactor D1-1, associated with the starter D1 is in its normally closed state, since the starter D1 is de-energized by the opening of the normally closed contactor RD2-1, caused by the energization of relay R-D2.

Figure 4:
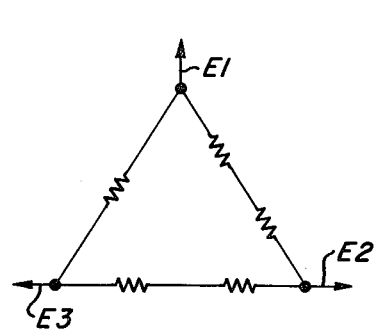

The de-energization of the starter D1 causes also the contactors D1A, D1B and D1C in the secondary circuits of the windings WS1-2, WS2-3 and WS1-3, respectively, to open, thereby disconnecting the D1 secondary configuration as shown in FIG. 3. However, the energization of the relay D2 caused the contactors D2A, D2B and D2C to pick up, thereby establishing the D2 secondary configuration for the secondary windings WS1 as shown in FIG. 4. The configuration as shown in FIG. 4 is a delta configuration which will establish a higher voltage across the lines E1-E2, E2-E3 and E1-E3, such as, for example, 120 volts as compared to the previous E1 energization of FIG. 3 of 60 volts.

The increased D2 energization at the lines E1, E2 and E3 thereby causes an increased DC output to appear across the DC lines VA+ and VA−, which causes an increased degree of energization to the traction motors TM1 and TM2. This, in turn, causes the acceleration of the vehicle to the slow tram speed. If the operator had initially selected the slow tram speed via the operator switch SW1, this would terminate the control and timing of the present system, with the shuttle car being driven at the slow tram speed until the operator desired to stop the shuttle car, reverse its direction of operation or increase the speed thereof to the fast tram speed.

Under the assumption that the operator had selected the fast tram speed, the renergization of the relay R-D2 also causes the contactor R-D2-3 to pick up, which is in series with contactor HSR3 which had previously been closed by the energization of the high speed HSR relay. This provides an energization path for a relay R-5 after a single time constant circuit STC1 times out. The single time constant circuit STC1 will time out after the time constant, for example, of one second. This time constant circuit is solely under the control of time and will cause the relay R-5 to energize therethrough after it times out.

Figure 5:
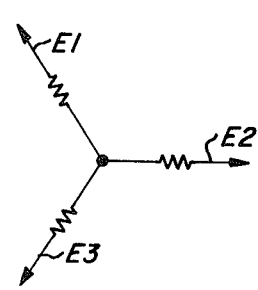

The activation of the relay R-5 causes the normally closed contactor RS1 to open thereby de-energizing the starter D2 which causes the D2 contactors D2A, D2B, and D2C to be opened, thereby disconnecting the D2 secondary configuration as shown in FIG. 4. Contact RS2 in the turn-on circuit of a triac TR7 turns on the triac TR7 causing the energization of the starter S via the now closed contactor D2-1 which reverts to its normally closed state with the deactivation of the starter D2. The energization of the starter S causes contactors SA, SB and SC in the circuits of the secondary windings WS1-2, WS2-3 and WS1-3, respectively, to close, thereby connecting the secondary of the transformer TF1 in the S connection as better shown in FIG. 5. The S connection is a wide Y configuration with, for example, 208 volts being developed across the lines E1-E2, E2-E3 and E1-E3. This thus determines the fast tram energization for the traction motors TM1 and TM2 with the high DC voltage being developed across the line VA+ and VA− for the full energization of the traction motors. The traction motors TM1 and TM2 will thus accelerate to the fast tram speed with this speed being maintained for the driving of the shuttle car until the operator desires to stop the vehicle, reverse the direction of operation, or revert to the slow tram speed.

Assume not that the operator desires to stop the shuttle car and reverse the direction of operation to high speed reverse. This is accomplished by the operator changing the foot switch position from the forward to the reverse position, which requires the foot switch going through the off position opening contactors FS1, FS2 and FS3. The opening of the contactor FS1 causes the de-energization of the forward starter FOR. Thus the contactors FOR2 and FOR associated with the field winding F1 of the traction motor TM1 are opened and the contactors FOR4 and FOR5 associated with the field winding F2 of the traction motor TM2 are also opened. The opening of the contactor FOR6 in series with the starter 1A and 2A causes the de-energization thereof. Also the brake relay BR is de-energized by the opening of the contactor FOR6, which causes the opening of the contactor BR1 in the timing circuit input. The opening of the contactor FS3 causes the de-energization of the tram relay TR which causes the opening of the contactor TR1 in the timing circuit TC with both contactors BR1 and TR1 being open, the entire timing circuit TC is disconnected. Also the opening of the contactor FS3 causes the RUN D1, 3A, D2 and S starters all to be de-energized, with allo the associated contactors reverting to their normal state so that the energization is removed entirely from the traction motors TM1 and TM2.

The operator in moving the foot switch through the off position to the reverse position automatically goes through a "brake" position and in so doing causes the contactor FS2 to close. The closing of the contactor FS2 causes the reverse starter REV to be energized via the normally closed contactors 1AR and FOR7. The starters FOR and REV are mechanically interlocked to insure that the forward relay had de-energized before the reversely relay can pick up.

The activation of the reverse starter REB causes the contactor REV1 connected across the contactor 1AR to close, thereby locking in the energization for the reverse relay REV. Also the activation of the reverse starter REV causes the reverse contactors REV2 and REV3 associated with the series winding F1 and the contactors REV4 and REV5 associated with the field winding F2 to be closed. When the traction motors TM1 and TM2 are being energized in the forward direction, current is flowing through the respective series field windings F1 and F2 into the dotted ends of these windings. When the traction motor is connected in this manner, it will become a DC generator. In the present control system, the energy stored in the moving car and its traction drives can be dissipated in the resistors (dynamic braking). This slows the car to a safe speed to apply power in the reverse direction.

Dynamic braking of the traction motors TM1 and TM2 is effected in the following manner. The opening of the forward contactors FOR2-FOR3 and FOR4-FOR5 and the closing of the reverse contactors REV2-REV3 and REV4-REV5 will thus connect the dotted end of the field winding F1 to the top end of the armature ARM1 and the dotted end of the field winding F2 to the top end of the armature ARM2, respectively. The traction motor TM1 will thus by dynamically braked with current flowing through the reverse contactor REV2, through the armature ARM1, from top to bottom, through the starting resistor RMA1, the diode DM1, the starting resistor RMB1 and then free-wheeling through the parallel connection of the diode pairs DA2-DA1, DB2-DB1 and DC2-DC1, between the lines VA− and VA+, through the overload relay OL1, the reverse contactor REV3 to the undotted end of the field winding F1. The same dynamic braking action occurs for the traction motor TM2 with current flowing from top to bottom through the armature ARM2, the resistor RMA2, the diode DM2, the resistor RMB2, the diode pairs of the full wave bridge FW1 to the undotted end of the field winding F2. The stored energy in the field windings F1 and F2 and the armatures ARM1 and ARM2 will be dissipated in the resistors RMA1-RMA2 and RMB1 and RMB2, respectively, with the motors TM1 and TM2 accordingly being dynamicaly braked to a low speed as the energy is dissipated.

With the foot switch FS in the reverse position and the dynamic braking of the traction motors TM1 and TM2 having occurred to a slow speed, the contactors FS2 and FS3 now will be closed to begin the energization and acceleration process for the traction motors TM1 and TM2 in the reverse direction in an identical manner as described above with respect to the forward direction. In brief, the closure of the reverse contactor REV6 permits energization of the starter 1A and also the energization of the brake relay BR. The closing of the switch FS3 causes the energization of the tram relay TR, and the activation of the brake relay closes the contactors BR1, which energizes the relay R-1A after an appropriate time delay which causes the starter R-2A to then be energized after a predetermmined time delay. The energization of the relay R-2A causes the contactor R-2A2 to be closed which inserts the remainder of the timing circuit TC into the circuit for the appropriate control of the 2A, RUN, D1, 3A, D2 and S starter in a fashion as described above for the forward direction.

Thus, in a typical cycle of operation, the operator of the shuttle car will proceed from the unloading station in a reverse direction, accelerating through the start-up, slow tram and fast tram speeds, with the AC cable B being payed out from the reel on the shuttle car as the shuttle car proceeds to a work area. When the operator reaches the work area, the shuttle car is stopped and material, such as coal, is loaded onto the shuttle car. The operator then places the switch in the forward direction and the shuttle car proceeds back toward the unloading area accelerating through the start-up, slow tram and fast tram speed. If desired the operator may proceed at the slow tram speed for the entire return distance under heavy load, for example, the AC cable B will be reeled onto the reel as the shuttle car proceeds towards the unloading station. At the unloading area the operator will stop the shuttle car for unloading, which is accomplished by the operator closing the conveyor switch FC and the operator's control which causes the energization of a conveyor starter CS which includes a coil and an overlow load relay. The energization of the conveyor starter CS causes contactors CM1, CM2 and CM3 to be closed thereby energizing the conveyor motor CM from the respective lines B1, B2 and B3 of the trailing cable B. The AC conveyor motor CM will thus drive the conveyor belt of the shuttle car removing the coal from the car to either another conveyor belt for removal from the mine or onto coal cars. As previously discussed, a hydraulic system is provided under the driving power of pump motor PM for raising and lowering the conveyor assembly to accommodate either a conveyor belt or coal cars. The conveyor motor CM is shown to be a single speed motor but may, of course, comprise a two-speed or multiple-speed AC motor depending upon the desired utilization conditions. After the unloading the operator may then proceed to return the shuttle car to the work area again.

FIG. 6 is a schematic diagram of the double time constant circuit DTC1 as utilized in FIG. 2. It should be understood, also, that the circuitry as shown in FIG. 6 could also be employed for the circuits of the double time constant circuits DTC2, DTC3, DTC4, and DTC5. The explanation of the operation of the circuit, however, will be made with reference to the double time constant circuit DTC1.

When the relay BR is energized, contactor BR1 is closed, establishing the V+ potential on the line as indicated in FIGS. 2 and 6. A voltage divider network, including a resistor R10 and a Zener diode Z10 is connected between the V+ and V− lines so that a fixed voltage VZ is developed across the Zener diode Z10, which is utilized as the operating voltages for the double time constant circuit. The relay coil R-1A is connected between the junction of the resistor R10 and the Zener diode Z10 and a line V10. A controlled switching device SCR which may comprise a silicon controlled rectifier, is connected from anode to cathode between the line V10 and the V− line. A voltage divider including a resistor R11 and a resistor R12 is connected between the lines V10 and V−. The voltage developed at the junction of the resistors R11 and R12 is utilized as the operating inter-base voltage for a programmed unijunction transistor PUT. The second base of the programmed unijunction transistor PUT is connected to the junction of the resistors R11 and R12 and the first base is connected to the gate electrode of the silicon controlled rectifier SCR via a resistor R13. A resistor R14 connects the gate electrode of the SCR to the V− line so that a suitable gating potential may be developed thereacross. The emitter electrode of the PUT is connected via a diode D10 to the junction point of a long time constant circuit comprised of a resistor RX and a capacitor CX connected between the lines V10 and V−. The emitter electrode of PUT is also connected via a diode D11 to the junction point of a short time constant circuit comprised of a resistor RY and a capacitor CY also connected between the lines V10 and V−. The resistors RX and RY may be variable resistors for adjusting the time constant of the respective time constant circuits. The long time constant circuit RX-CX may for example have a time constant of one second. The short time constant circuit RY-CY may, for example, have a time constant of one-tenth of a second. A series shorting circuit including a diode D12, the resistor RV and the contactor VR1 is connected between the junction point of the resistor RY and the capacitor CY and the V− line. The contactor VR1 is under the control of the relay coil VR in the armature circuits of the traction motors TM1 and TM2 as previously explained. The contactor VR1 remains open until the relay VR is energized. The energization of the relay VR occurs when the voltage across the starting resistor RMB1 or RMB2 exceeds the threshold value of either both Zener diodes ZV1 and ZV2 or just the Zener diode ZV1 when the contactor R-2A3 is closed to short out the Zener ZV2.

Assuming that the contactor VR1 is in its open condition, the capacitor CY will charge from the V10 line at the fast time constant until the firing voltage of the PUT is reached. At this time the capacitor CY will discharge through the diode D11 and the PUT to provide getting current to the gate electrode of the SCR which will be turned on in response thereto. An energization path will then be provided for the relay coil R-1A through the anode-cathode circuit of the SCR. As long as the relay contactor VR1 remains in its open state, the time circuit as shown in FIG. 6 will time out at the fast time constant, for example, of one-tenth of a second.

Assume now, however, that the degree of energization of traction motors TM1 and TM2 is such that the relay VR is energized and the contactor VR1 closes. The capacitor CY is thus essentially short circuited through the diode D12 and the resistor RV, which is selected to have a relatively low resistance, and the closed contactor VR1. This, accordingly, disengages the short time constant circuit CY-RY from affecting the timing operation of the circuit. Capacitor CX, however, charges according to its slow constant from the V10 line through the resistor RX until the firing voltage of the PUT is reached. After the time constant of approximately one second is reached, the capacitor will have reached the firing voltage, and will discharge via diode D10 and the PUT to provide a turn-on signal to the gate of the SCR which will turn on and provide an energizing path for the relay coil R-1A.

The operation of the double time constant circuit DTC5 is identical to that as described above, except that the contactor VR1 and the resistor RV are replaced by the current relay contactor CR1 and the resistor RCR, respectively. The current relay contactor CR1 is controlled by the current relay CR which is connected in the secondary winding circuit WS1-3, with the contactor CR1 being normally open when the current in the secondary winding is below a predetermined value and in a closed condition when the current is above a predetermined value. The double time constant circuit DTC5 will time out at the fast time constant when the contactor CR1 is open and at the slow time constant when contactor is in a closed state.

Figure 7:
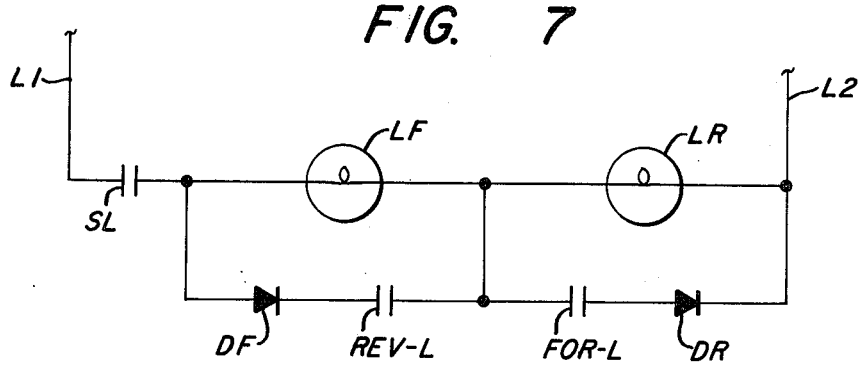
FIG. 7 is a schematic diagram of a light circuit as utilized in the system of FIG. 2.

FIG. 7 shows a light control circuit which may be employed witin the present system for providing operating illumination and safety lighting for the shuttle car. As shown in FIG. 2, the transformer TF2 includes a second secondary winding WS2B, which is utilized for providing operating power to lines L1 and L2 for the light control circuit of FIG. 7. The light control circuit is energized by the operator closing a switch SL which supplies energization for a pair of electric lamps or lights LF an LR which may each comprise any standard lamp such as a sealed beam headlamp as commonly employed in mining operations. The voltage output of the secondary winding WS2B may typically be 12 volts. Only a single light LF and RF is shown; however, it should be understood that various other lights may be paralleled, respectively, with each of the lights LF and RF. A diode DF and a contactor REV-L is connected across the forward light LF and a contactor FOR-L and a diode DR is connected across the reverse light LR.

The light LF has been designated as the forward light and is intended, for example, for mounting on the shuttle car (see FIG. 1) to illuminate in the forward direction when the car is moving in that direction. Conversely the light LR is intended for mounting at the rear of the shuttle car (see FIG. 1) and is intended to provide illumination when the car is moving in the reverse direction.

Assume, initially, that the forward contactor FOR-L is closed and the reverse contactor REV-L is open. When the line L1 is positive with respect to line L2, energizing current will be supplied with full intensity to the light LF. However, the light LR will be shunted by the closed contactor FOR-L and the diode DR to the line L2. Thus during the positive half-cycle the forward light LF will receive full energization while the reverse light LR will receive essentially no energization. During the next half-cycle when the line L2 is positive with respect to the line L1, the rear light LR will be partially energized due to the blocking action of the diode DR blocking current from passing through the shunt path including the contactor FOR-L and the diode DR. Thus the voltage across the line L1 and L2 during the negative half-cycle will be divided between the lamps LF and LR so that each of them will receive half illuminating current. The above described operation will continue with the forward lamp receiving full energization during the positive half-cycles and only half illumination during the negative half-cycles, while the lamp LR receives only half energization only during the negative half-cycles. The net result is that the forward light LF will provide a relatively high degree of illumination in the forward direction illuminating the area in front of the vehicle when the car is moving in that direction, while the reverse light LR will provide a lower illumination which may be utilized as a tail light indicator for safety purposes.

Conversely, when REU-L is closed and FOR-L is open the reverse light LR will be receiving full energization during one half-cycle and half energization during the next half-cycle, while the forward light LF will be receiving half energization only during one half-cycle. Thus the reverse light LF may be utilized for illuminating the area in a direction of the vehicle operation while the front light LF may be utilized as a tail light for safety purposes.

SUMMARY

The invention comprises an AC-DC system of providing tractive power to a mobile variable path mining machine. A fixed source of AC electrical power feeds a three phase AC trailing cable which is electrically and mechanically connected to a mobile machine. On board the mobile machine is a reeling system which either picks up or plays out the trailing cable as the machine shuttles toward or away from the fixed power source. AC power supplied by the trailing cable is converted into adjustable voltage DC and used to operate traction motors which provide surface movement of the mobile machine. The polarity and voltage level of the DC is controlled to provide for the sequence of operating the mobile machine.

What is claimed is:

1. A mobile machine comprising, a machine body, a plurality of surface engaging means carried by said body and relatively movable with respect thereto and continuously engaging the ground, at least one DC traction motor carried by said body and cooperable with at least some of said surface engaging means to cause movement thereof, steering means carried by said body for selectively controlling said surface engaging means to move said machine body in a selected path, conversion means carried by said body for converting a three phase AC input to an electrical DC output, control means carried by said body for controllably applying said DC output to said DC traction motor, and a flexible trailing cable connected to said conversion means for selectively supplying said three phase AC input to said conversion means.

2. The combination of claim 1 wherein: said conversion means includes transformer means energizable through said cable to provide a three phase AC output, and rectifier means energizable by said AC output to provide said DC output.

3. The combination of claim 2 wherein: said control means is operative to control the output of said transformer means to selectively control energization of said DC traction motor to selectively control movement of said surface engaging means.

4. The combination of claim 3 wherein: said transformer means includes a primary and a plurality of secondary windings, and said control means is operative by preselection of one of said secondary windings to obtain a desired output of said transformer means.

5. The combination of claim 4 wherein: said control means includes timing circuit means for regulating the duration of energization of said preselected secondary windings under different desired output requirements.

6. The combination of claim 5 including: sensing means for sensing the degree of energization of said DC traction motor to selectively energize certain portions of said timing circuit means; said portions of said timing circuit means being responsive to the degree of energization sensed and controlling the duration of such energization by a preselected secondary winding of said transformer means.

7. The combination of claim 4 wherein the configuration of said secondary windings consists of an extended delta connection, a delta connection and a star connection.

8. The combination of claim 7 wherein said extended delta connection is operably connected when the degree of energization of said traction motor is controlled from zero acceleration through a first stage of acceleration.

9. The combination of claim 8 wherein said delta connection is operably connected when the degree of energization of said traction motor is controlled in a second stage of acceleration.

10. The combination of claim 9 wherein said star connection is operably connected when the degree of energization of said traction motor is controlled in a third stage of acceleration.

11. The combination of claim 1 wherein: said DC traction motor is reversibly operated and said control means includes circuitry means for controlling the direction of operation of said traction motor.

12. The combination of claim 11 wherein: said control means includes means for selecting a plurality of predetermined degrees of energization of said traction motor so that corresponding speeds of operation of said mobile machine may be effected in either direction.

13. The combination of claim 12 including dynamic braking means for said traction motor rendered effective prior to a first stage of said operation of said traction motor in both a forward and reverse direction.

14. The combination of claim 13 further including means for sequencing degrees of effectiveness of said dynamic braking of said motor.

15. The combination of claim 1 further characterized by including a lamp control circuit operable cooperatively with said control means for controlling the degree of illumination, with respect to one another, of a first and a second electrical lamp operatively connected across one phase of said AC input at said mobile machine, said lamp control circuit comprising: a first circuit means including first switch means and a first unidirectional device operatively connected in series across said first lamp, and second circuit means including second switch means and a second unidirectional device operatively connected in series across said second lamp, said first lamp being illuminated to a greater degree than said second lamp when said first switch means is in an open state and said second switch means is in a closed state said second lamp being illuminated to a greater degree than said first lamp when said second switch means is in an open state and said first switch means is in a closed state.

16. In a control drive system for a wheeled vehicle operative between a work area and a station point which is supplied with three phase AC via a cable connected between a source of three phase AC at said station point and said vehicle, said vehicle being driven by at least one DC traction motor, the combination of: conversion means carried by said vehicle for converting said AC from said cable to DC, said conversion means including transformer means having primary and secondary windings responsive to the AC from said cable for providing a three phase AC output; rectifier means responsive to the AC output of said transformer means for providing said DC; and control means for controllably applying said DC from said conversion means to said traction motor for controllably driving said vehicle; said control means operative to control the output of said transformer means to said conversion means by selection of one of a plurality of different configurations of said secondary windings so that the degree of energization of said traction motor is selectively controlled for acceleration of said vehicle.

17. The combination of claim 16 wherein said traction motor includes an armature and a field winding and wherein: said control means further includes a forward means and a reverse means for respectively establishing a forward and a reverse energization of the field winding of the traction motor and operative when said motor is to be deenergized or reversed to disconnect said conversion means and to disconnect the connected of said forward or reverse means from said field winding and to connect the unconnected of said forward or reverse means to said field winding so that a current path is provided through the connected of said forward or reverse means said armature and said conversion means for dynamically braking said traction motor.

18. A method of operating a mobile machine of the type which is driven by traction motors electrically energized through a trailing cable in an underground passageway of a mine in which mining operations are conducted, comprising the steps of: selectively reeling and unreeling said trailing cable with respect to said machine as required during movement of said machine through selectable paths spaced from said source and with some paths of said selectable paths constituting random paths; converting at the machine end of said trailing cable at least a portion of a three phase AC input to a DC output; and selectively energizing at least the traction motors of said mobile machine by said DC output.

* * * * *

REEXAMINATION CERTIFICATE (1856th)
United States Patent [19]
Norris

[11] B1 4,042,864
[45] Certificate Issued  Dec. 1, 1992

[54] AC-DC TRACTION DRIVE CONTROL SYSTEM

[75] Inventor: Melvin N. Norris, Franklin, Pa.

[73] Assignee: Joy Manufacturing Company, Pittsburgh, Pa.

Reexamination Request:
No. 90/000,843, Aug. 23, 1985

Reexamination Certificate for:
Patent No.: 4,042,864
Issued: Aug. 16, 1977
Appl. No.: 585,210
Filed: Jun. 9, 1975

Related U.S. Application Data

[63] Continuation of Ser. No. 278,665, Jul. 31, 1972, abandoned, which is a continuation of Ser. No. 16,309, Mar. 4, 1970, abandoned.

[51] Int. Cl.$^5$ ............................................. H02D 7/00
[52] U.S. Cl. .................................................. 318/257
[58] Field of Search ............... 315/82, 83; 307/10 LS; 318/257

[56] References Cited

U.S. PATENT DOCUMENTS

| | | | |
|---|---|---|---|
| 1,123,602 | 1/1915 | Session . | |
| 1,903,704 | 4/1933 | Levin et al. . | |
| 2,090,707 | 8/1937 | Sloane | 242/91 |
| 2,434,585 | 1/1948 | Renshaw et al. | 191/3 |
| 2,539,190 | 1/1951 | Hibbard | 318/94 |
| 2,549,405 | 4/1951 | Alexanderson et al. | 318/94 |
| 2,599,061 | 6/1952 | Lee | 214/83.36 |
| 2,754,015 | 7/1956 | Lee | 214/83.36 |
| 2,925,136 | 2/1960 | Lee | 180/49 |
| 3,250,944 | 5/1966 | Musick et al. | 318/395 |
| 3,257,597 | 6/1966 | Weiser | 318/344 |
| 3,378,755 | 4/1968 | Sawyer | 322/29 |
| 3,412,819 | 11/1968 | Kruckman | 180/2 |
| 3,584,281 | 6/1971 | Reeves et al. | 318/258 |

FOREIGN PATENT DOCUMENTS

1803555 of 0000 Fed. Rep. of Germany .
1152782 2/1958 France .

OTHER PUBLICATIONS

P & H 2800 Electric Mining Shovels Main Machine Specifications.
P & H 2800 Electric Mining Shovels Descriptive Specifications.
New Design Concepts for Electric Mining Shovels, L. A. Price and W. J. Cherones, Society of Mining Engineers of AIME, Preprint No. 69-AO-59.
National Mine Service Company, Clarkson Division Drawing 48698 entitled "Wiring Diagram Marietta Miner".
National Mine Service Company, Clarkson Division Drawing MM-192 entitled "Marietta Miner Ass'y Type 780".
G. E. Controlled Rectifier Manual, General Electric Corporation, forward and reverse cover pages, copyright page, pp. 92, 93, 95-98, 100-103, and 179-181 (1960).
"Cable-Reel mine Gathering Locomotives", General Electric Corporation, pp. 1-16, GEA-4846A.
"G-E Mining-Type Mercury-Arc Rectifiers", General Electric Corporation, pp. 1-8, GEA-4047A.
"A New Power Conversion Unit for the Mining Industry", Mining Congress Journal, by Dunn, vol. 48, No. 4, pp. 30-32, (Apr. 1962).
"Low-Profile Semiconductor Equipment for Mine Application", IEEE Transactions On Industry and General Applications, by Wood et al., vol. IGA-4, No. 3, pp. 254-259, (May/Jun. 1968).
"Electric Locomotives For The Muskingum Electric Railroad", IEEE Conference Record of 1968 Third Annual Meeting of the IEEE Industry and General Applications Group, by Oliver et al., pp. 319-330, LT-WED-3 presented Sep. 29-Oct. 3, 1968.

Primary Examiner—A. Jonathan Wysockt

[57] ABSTRACT

A control drive system for a vehicle, such as a shuttle car, operating back and forth between a work area and an unloading point wherein AC supplied from the unloading point is supplied to the vehicle via a cable and is converted to DC aboard the vehicle, and wherein control circuitry is provided for effecting the start-up, acceleration in forward and reverse directions and the operation of the vehicle at tram speeds in either direction.

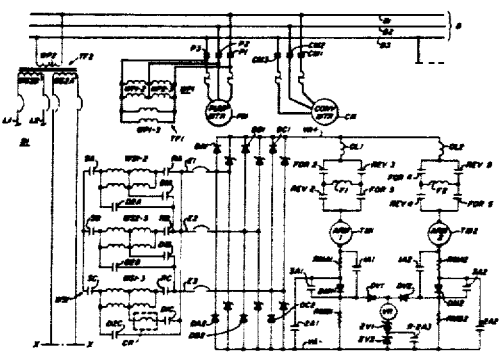

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–4, 11,12, 16 and 18 are cancelled.

Claim 5,7,13,15 and 17 are determined to be patentable as amended.

Claims 6,8–10 and 14, dependent on an amended claim, are determined to be patentable.

5. [The combination of claim 4] *A steerable mobile machine energized through a trailing cable for use in forming a passageway by mining and hauling coal from an underground seam, such as mined material transporting shuttle car, comprising a machine body, a plurality of surface engaging means carried by said body and relatively moveable with respect thereto and continuously engaging the ground, at least one DC traction motor carried by said body and cooperable with at least some of said surface engaging means to cause movement thereof, steering means carried by said body for selectively controlling said surface engaging means to move said machine body in a selected path, conversion means carried by said body for converting a three phase AC input into an electrical DC output, control means carried by said body for controllably applying said DC output to said DC traction motor, and a flexible trailing cable connected to said conversion means for selectively supplying said three phase AC input to said conversion means wherein said conversion means includes transformer means energizable through said cable to provide a three phase AC output, and rectifier means energizable by said AC output to provide said DC output, and wherein said control means is operative to control the output of said transformer means to selectively control energization of said DC traction motor to selectively control movement of said surface engaging means, wherein said transformer means includes a primary and a plurality of secondary windings, and said control means is operative by preselection of one of said secondary windings to obtain a desired output of said transformer means, and* wherein said control means includes timing circuit means for regulating the duration of energization of said preselected secondary windings under different desired output requirements.

7. The combination of claim [4] *5* wherein the configuration of said secondary windings consists of an extended delta connection and a star connection.

13. [The combination of claim 12] *A steerable mobile machine energized through a trailing cable for use in forming a passageway by mining and hauling coal from an underground seam, such as mined material transporting shuttle car, comprising a machine body, a plurality of surface engaging means carried by said body and relatively moveable with respect thereto and continuously engaging the ground, at least one DC traction motor carried by said body and cooperable with at least some of said surface engaging means to cause movement thereof, steering means carried by said body for selectively controlling said surface engaging means to move said machine body in a selected path, conversion means carried by said body for converting a three phase AC input into an electrical DC output, control means carried by said body for controllably applying said DC output to said DC traction motor, and a flexible trailing cable connected to said conversion means for selectively supplying said three phase AC input to said conversion means wherein said DC traction motor is reversibly operated and said control means includes circuitry means for controlling the direction of operation of said traction motor wherein said control means includes means for selecting a plurality of predetermined degrees of energization of said traction motor so that corresponding speed of operation of said mobile machine may be effected in either direction* including dynamic braking means for said traction motor rendered effective prior to a first stage of said operation of said traction motor in both a forward and reverse direction.

15. [The combination of claim 1 further characterized by] *A steerable mobile machine energized through a trailing cable for use in forming a passageway by mining and hauling coal from an underground seam, such as mined material transporting shuttle car, comprising a machine body, a plurality of surface engaging means carried by said body and relatively moveable with respect thereto and continuously engaging the ground, at least one DC traction motor carried by said body and cooperable with at least some of said surface engaging means to cause movement thereof, steering means carried by said body for selectively controlling said surface engaging means to move said machine body in a selected path, conversion means carried by said body for converting a three phase AC input into an electrical DC output, control means carried by said body for controllably applying said DC output to said DC traction motor, and a flexible trailing cable connected to said conversion means for selectively supplying said three phase AC input to said conversion means* further characterized by including a lamp control circuit operable cooperatively with said control means for controlling the degree of illumination, with respect to one another, of a first and a second electrical lamp operatively connected across one phase of said AC input at said mobile machine, said lamp control circuit comprising: a first circuit means including *a* first switch means and a first unidirectional device operatively connected in series across said first lamp, and second circuit means including second switch means and a second unidirectional device connected in series across said second lamp, said first lamp being illuminated to a greater degree than said second lamp when said first switch means is in an open state and said second switch means is in a closed state said second lamp being illuminated to a greater degree than the first lamp when said second switch means is in an open state and said first switch means is in a closed state.

17. [The combination of claim 16] *In a control drive system for a steerable wheeled vehicle energized through a trailing cable for use in forming a passageway by mining and hauling coal from an underground seam, such as a mined material transporting shuttle car operative between a work area and a station point which is supplied with three phase AC via said cable connected between a source of three phase AC at said station point and said vehicle, said vehicle being driven by a least one DC traction motor, the*

*combination of: conversion means carried by said vehicle for converting said AC from said cable to DC, said conversion means including transformer means having primary and secondary windings responsive to the AC from said cable for providing a three phase AC output; rectifier means responsive to the AC output of said transformer means for providing said DC; and control means for controllably applying said DC from said conversion means to said traction motor for controllably driving said vehicle; said control means operative to control the output of said transformer means to said conversion means by selection of one of a plurality of different configurations of said secondary windings so that the degree of energization of said traction motor is selectively controlled for acceleration of the vehicle* wherein said traction motor includes an armature and a field winding and wherein: said control means further includes a forward means and a reverse means for respectively establishing a forward and a reverse energization of the field winding of the traction motor and operative when said motor is to be deenergized or reversed to disconnect said conversion means and to disconnect the connected of said forward or reverse means from said field winding and to connect the unconnected of said forward or reverse means to said field winding so that a current path is provided through the connected of said forward or reverse means said armature and said conversion means for dynamically braking said traction motor.

* * * * *